United States Patent [19]

Tanabe

[11] Patent Number: 5,019,847
[45] Date of Patent: May 28, 1991

[54] SHUTTER DEVICE
[75] Inventor: Yoshiaki Tanabe, Kawasaki, Japan
[73] Assignee: Nikon Corporation, Tokyo, Japan
[21] Appl. No.: 581,052
[22] Filed: Sep. 12, 1990
[30] Foreign Application Priority Data
Sep. 19, 1989 [JP] Japan ............................. 1-108627[U]
[51] Int. Cl.$^5$ ................................................ G03B 9/40
[52] U.S. Cl. ..................................... 354/246; 354/250
[58] Field of Search ............... 354/246, 247, 245, 226, 354/250, 252, 248, 249

[56] References Cited
U.S. PATENT DOCUMENTS

| 4,493,544 | 1/1985 | Uematsu | 354/246 |
| 4,660,952 | 4/1987 | Toyoda et al. | 354/246 |
| 4,926,202 | 5/1990 | Fukuda et al. | 354/246 |

Primary Examiner—L. T. Hix
Assistant Examiner—Howard B. Blankenship
Attorney, Agent, or Firm—Shapiro and Shapiro

[57] ABSTRACT

A focal-plane shutter device comprises aperture opening blades including a blade with an edge for forming an exposure slit, aperture closing blades including a blade with an edge for forming the exposure slit, first and second base plates disposed between the aperture opening blades and the aperture closing blades and each having an aperture for forming an exposure aperture, and a means for spacing the first and second base plates by a predetermined distance. According to the above composition, even is the slit forming edge of the blade of the aperture closing blades is moved at high speed, it is prevented from colliding with the first and second base plates.

4 Claims, 4 Drawing Sheets

SHUTTER DEVICE

BACKGROUND OF THE INVENTION

1. Field of the Invention

The present invention relates to a focal-plane shutter device of a camera.

2. Related Background Art

This kind of shutter device has the following problem: when a blade of aperture closing blades for forming an exposure slit is braked just before it covers an aperture and stops running, the center portion of the slit forming blade is bent and collides with a base plate. An example of a conventional device to solve this problem is disclosed in, for example, U.S. Pat. No. 4,493,544. The conventional device will be described in brief with reference to FIGS. 4A to 4C.

In order to make the description plain, only a first base plate 1, a second base plate 2, a blade 3 of aperture closing blades for forming an exposure slit and a blade 4 of aperture opening blades for forming the exposure slit are shown in FIGS. 4A to 4C. FIG. 4A is a perspective view showing a state in which the aperture closing blades have completed running and have covered an exposure aperture after the aperture opening blades have run, opened the exposure aperture and exposed a film plane. FIG. 4B is a front view of the state and FIG. 4C is a sectional view of a portion indicated by arrows C—C in FIG. 4B.

The first base plate 1 has a rectangular aperture bounded by edges $1a$, $1b1c$ and $1d$, and the second base plate 2 has a rectangular opening bounded by edges $2a$, $2b$, $2c$ and $2d$. A rectangular aperture A, which has the edges $1a$, $2a$, $1c$ ($2c$) and $1d$ ($2d$) as shown in FIG. 4B, is formed by overlapping the first base plate 1 and the second base plate 2. The edges $1c$ and $2c$ are exactly aligned with the same plane and the edges $1d$ and $2d$ are exactly aligned with the same plane. A slit forming edge $3a$ of the aperture closing blades is positioned a predetermined width $W_1$ lower than the edge $2a$ in the running direction of the aperture closing blades (downward in FIG. 4C) and constitutes an overlapping portion having the predetermined width $W_1$. The edge $1b$ is positioned a predetermined width $W_2$ lower than the slit forming edge $3a$ in the running direction of the aperture closing blades and forms an opening having the predetermined width $W_2$. Therefore, a concave portion $R_1$ having a width of $W_1 + W_2$ and a depth corresponding to the thickness $t_1$ of the first base plate 1 is formed between the edges $2a$ and $1b$. Similarly, a concave portion $R_2$ having a depth corresponding to the thickness $t_3$ of the second base plate 2 is formed between the edges $2b$ and $1a$.

The slit forming blade 3 extends to cross the aperture A and is slidable upward and downward, and both edges thereof overlap the first base plate 1. The slit forming blade 3 moves together with an unillustrated divided cover blade downward in FIG. 4C, closes and shades the aperture A, moves upward, and opens the aperture A to make an exposure operation.

The slit forming blade 4 almost similarly extends to cross the aperture A and is slidable upward and downward, and both edges thereof overlap the second base plate 2. The slit forming blade 4 moves upward in FIG. 4C, closes and shades the aperture A, moves downward and opens the aperture A to make an exposure operation.

Before a shutter release operation is performed, the aperture opening blades including the blade 4 cover the aperture A and the aperture closing blades including the blade 3 are put away upward in the figure to open the aperture A.

When the shutter release operation is performed, the aperture opening blades, which have shaded the aperture A, move downward and start an exposure operation. The blade 4 stops at the position shown in FIG. 4C and is put away. When a predetermined time has passed after the aperture opening blades start to move, the aperture closing blades move downward to shade the aperture A. Then, the blade 3 stops at the position shown in FIG. 4C and the exposure operation is completed. Even if the running blade 3 of the aperture closing blades is braked just before it completes its ruining operation and the center portion of the blade 3 is bent by kinetic energy in the direction of the optical axis, since the edge $2a$ of the aperture A is spaced by the distance corresponding to the depth $t_1$ of the concave portion $R_1$ from the blade 3, the blade 3 does not collide with the edge $2a$. Furthermore, since there is a space having the predetermined width $W_2$ between the slit forming edge $3a$ of the blade 3 and the edge $1b$ of the first base plate 1, the edge $3a$ does not collide with the edge $1b$.

The above-mentioned art is advantageous in a conventional shutter device in which a blade for forming a slit is made of a rigid material such as iron and the running speed of the blade is comparatively low.

However, if the shutter blade is made of a light material, such as aluminum, titanium, or a compound material thereof, which has recently been put into practical use, so as to obtain a high shutter speed, since the rigidity of the slit forming blade is lower than that of the blade made of an iron or the like, the degree to which the center portion of the blade is bent by braking the blade running at high speed is increased, and the space corresponding to the thickness of the base plate in the conventional device is insufficient. As a result, the edge of the blade collides with the edge of the opening of the base plate and the blade is broken or cracked.

SUMMARY OF THE INVENTION

An object of the present invention is to provide a focal-plane shutter in which a slit forming edge of a shutter blade, made of a light material and movable at high speed, is prevented from colliding with the edge of an opening of a base plate.

A focal-plane shutter of the present invention comprises a first base plate opposite to aperture closing blades and a second base plate opposite to aperture opening blades, which base plates are disposed between the aperture closing blades and the aperture opening blades. A space $t_2$ having a predetermined distance in the direction of the optical axis is disposed between the first and second base plates in the position of an edge of the second base plate opposite to a slit forming edge of the aperture closing blades while an exposure aperture is covered with the aperture closing blades.

When the aperture closing blades are covering an aperture of the first base plate, an edge of an aperture of the second base plate has an overlapping portion having a predetermined width $W_1$ in the running direction of the aperture closing blades between the edge and the slit forming edge of the aperture closing blades. An edge of an aperture of the first base plate is spaced by a predetermined width $W_2$ from the slit forming edge of the aperture closing blades in the running direction of the aperture closing blades.

DESCRIPTION OF PREFERRED EMBODIMENT

Figure 1:
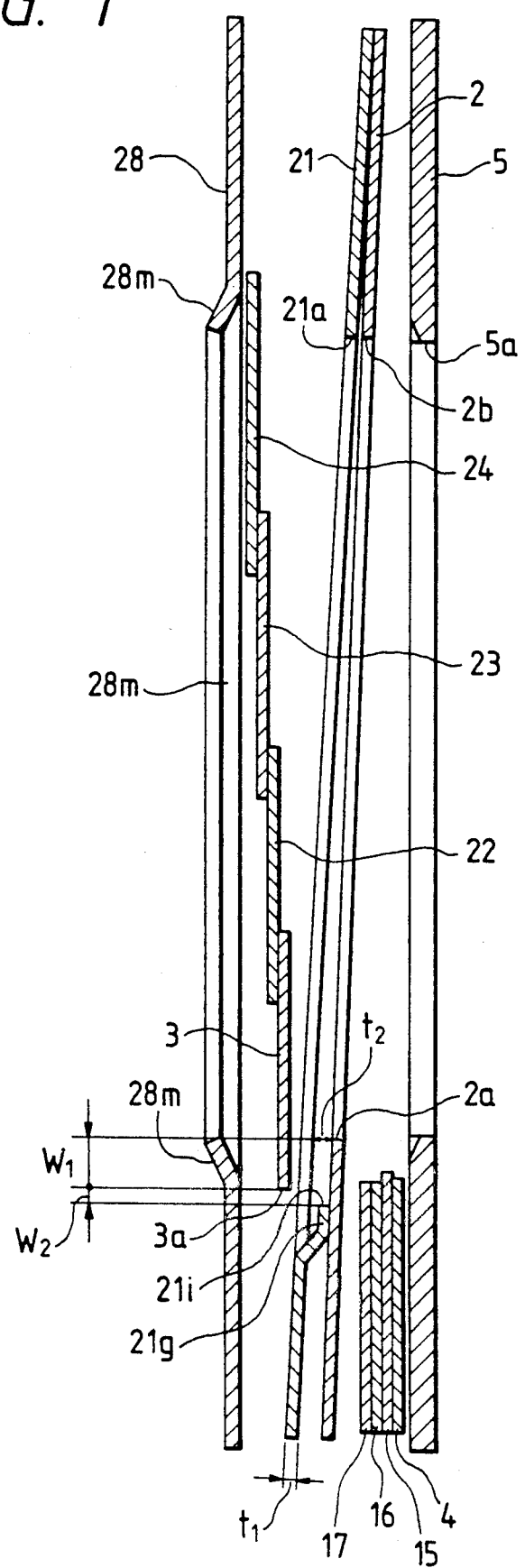
FIG. 1 is a vertical sectional view of a shutter device according to an embodiment of the present invention showing a state in which an exposure operation has been completed.
Figure 2:
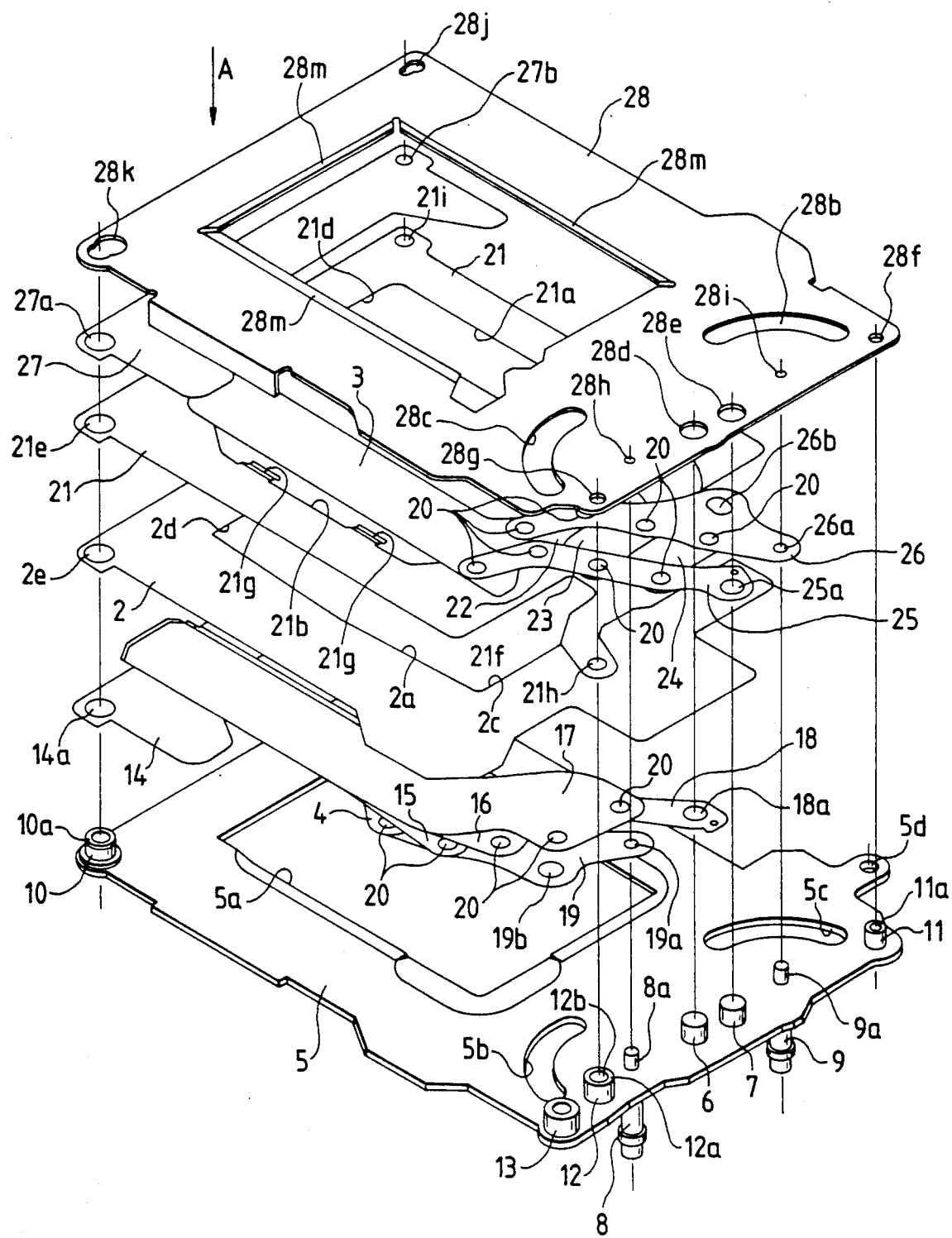
FIG. 2 is a perspective development view of the shutter device of the embodiment.

FIG. 1 shows a state of a focal-plane shutter according to an embodiment of the present invention just after an exposure operation is completed, and FIG. 2 is a perspective development view of the shutter device of the above embodiment.

Referring to FIG. 2, a shutter base plate 5 has an aperture 5a, arc holes 5b and 5c, and a hole 5c, and further has shafts 6, 7, 8, 9, 10, 11, 12 and 13 set therein.

A presser plate 14 for supporting a leading end of each shutter blade of aperture opening blades has a hole 14a and an unillustrated hole into which the shaft 10 and an unillustrated shaft set in the shutter base plate 5 are fitted respectively, thereby mounting the presser plate 14 on the shutter base plate 5. The presser plate 14 has almost the same shape as that of a presser plate 27, described below, for supporting a leading end of each shutter blade of aperture closing blades. The above-mentioned shaft fitted into a transformed hole 28j of a rear cover plate 28 is fitted into the above-mentioned unillustrated hole.

The aperture opening blades are mounted on the shutter base plate 5 as the leading ends of the shutter blades are supported on the presser plate 14. The aperture opening blades comprise a blade 4 for forming a slit and shutter blades 15, 16 and 17 adjoining the blade 4, which are supported by a driven arm 18 and a driving arm 19.

The driven arm 18 rotatably supports the aperture opening blades 4, 15, 16 and 17 respectively with a pin 20 and has a hole 18a. The driven arm 18 is rotatable on the shaft 6 since the shaft 6 is fitted into the hole 18a. The driving arm 19 rotatably supports the aperture opening blades 4, 15, 16 and 17 respectively with the pin 20, and has holes 19a and 19b. Since an end 8a of the shaft 8 is fitted into the hole 19a, the driving arm 19 is rotatable on the shaft 8.

The aperture opening blades 4, 15, 16 and 17, the shutter base plate 5, the driven arm 18 and the driving arm 19 constitute a parallel link mechanism known to those skilled in the art.

A second base plate 2 is disposed on the aperture opening blades, and has a rectangular exposure aperture bounded by edges 2a, 2b, 2c and 2d and a hole 2e into which the shaft 10 is fitted.

A first base plate 21 is disposed on the second base plate 2, and has a rectangular exposure aperture bounded by edges 21a, 21b 21c and 21d, holes 21e and 21i and an arm portion 21f. Foldings 21g folded downward in the figure are mounted on the edge 21b and there is a hole 21h in the arm portion 21f. The shaft 10 is fitted into the hole 21e and an unillustrated shaft is fitted into the hole 21i. The arm portion 21f is laid on an upper plane 12a of the shaft 12, and the center of the hole 21h of the arm portion 21f and that of a threaded hole 12b of the shaft 12 are almost aligned with each other. The folding 21g is, as shown in FIG. 1, formed to make a space having a predetermined distance $t_2$ between the first base plate 21 and the second base plate 2.

The aperture closing blades are disposed on the first base plate 21, and are comprised of a blade 3 for forming the slit and shutter blades 22, 23 and 24 adjoining the blade 3, which are supported by a driven arm 25 and a driving arm 26.

The driven arm 25 rotatably supports the aperture closing blades 3, 22, 23 and 24 with the pin 20 and has a hole 25a. Since the shaft 7 is fitted into the hole 25a, the driven arm 25 is rotatable on the shaft 7. The driving arm 26 also rotatably supports the aperture closing blades 3, 22, 23 and 24 with the pin 20 and has holes 26a and 26b. Since an end 9a of the shaft 9 is fitted into the hole 26a, the driving arm 26 is rotatable on the shaft 9.

The aperture closing blades 3, 22, 23 and 24, the shutter base plate 5, the driven arm 25 and the driving arm 26 constitute a parallel link mechanism known to those skilled in the art.

The presser plate 27 is disposed on a leading end of each blade of the aperture closing blades and slidably supports the aperture closing blades. The presser plate 27 has holes 27a and 27b into which the shaft 10 of the shutter base plate 5 and an unillustrated shaft are fitted respectively.

Figure 3:
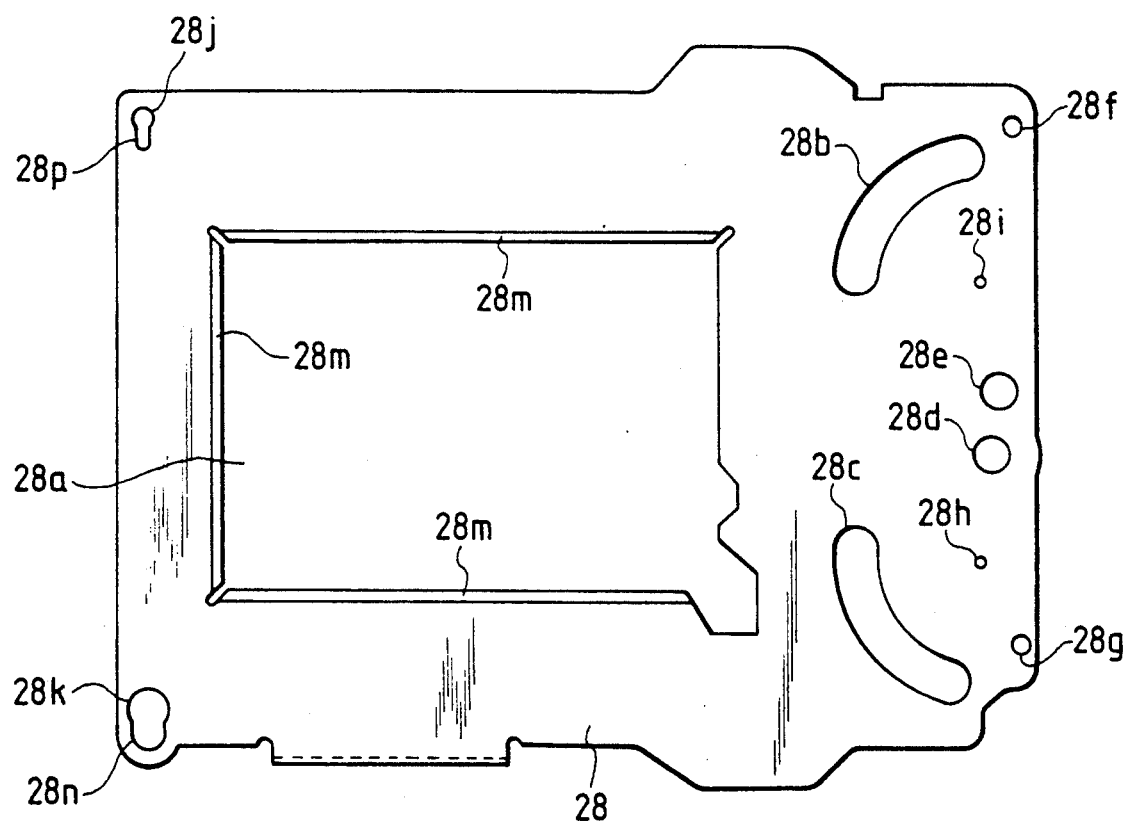
FIG. 3 is a top view of a rear cover plate.
Figure 4A:
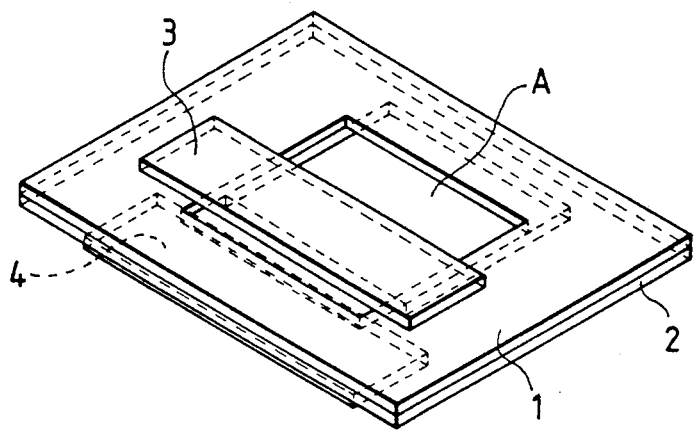
FIG. 4A is a perspective view of a conventional shutter device.
Figure 4B:
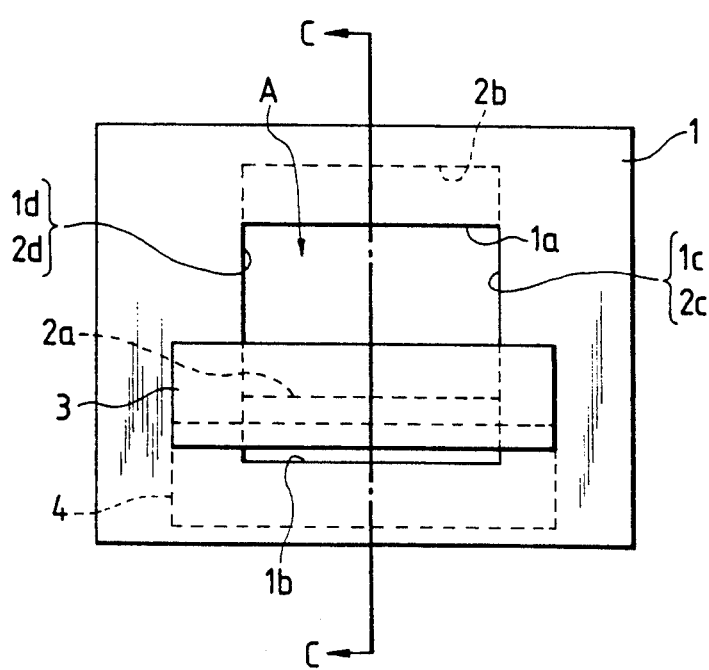
FIG. 4B is a front view of the conventional shutter device.
Figure 4C:
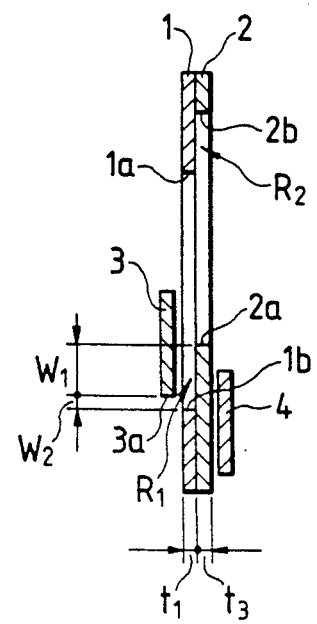
FIG. 4C is a sectional view of a portion indicated by arrows C—C in FIG. 4B.

The rear cover plate 28 is disposed on the presser plate 27 and the aperture closing blades. FIG. 3 shows the rear cover plate 28 as seen from the direction of the arrow A in FIG. 2. The rear cover plate 28 has an almost rectangular aperture 28a, arc holes 28b and 28c, holes 28d, 28e, 28f, 28g, 28h and 28i and transformed holes 28j and 28k. Foldings 28m folded upward in the figure are mounted on three sides of the aperture 28a. The rear cover plate 28 is positioned such that the centers of the holes 28f and 28g are aligned with those of a threaded hole 11a of the shaft 11 and the threaded hole 12b of the shaft 12. Unillustrated screws penetrate the holes 28f and 28g and are screwed into the threaded holes 11a and 11b, thereby mounting the rear cover plate 28 on the shutter base plate 5. The transformed holes 28k and 28j have, as shown in FIG. 3, narrow hole portions 28n and 28p respectively. When the rear cover plate 28 is mounted on the shutter base plate 5, a peripheral groove 10a of the shaft 10 and a peripheral groove of an unillustrated shaft are respectively fitted into the narrow hole portions 28n and 28p. The shafts 6 and 7 are respectively fitted into the holes 28d and 28e, and the centers of the holes 28h and 28i are not aligned with those of the shafts 8a and 9a.

Procedures for operating the shutter device will now be described.

In the state in which shutter charging is completed, the aperture opening blades 4, 15, 16 and 17 expand upward in FIG. 1 so as to cover and shade the aperture 5a of the shutter base plate 5, and the aperture closing blades 3, 22, 23 and 24 are contracted so as to be put away between the first base plate 21 and the rear cover plate 28 in the upper side of the figure so as to open the aperture 5a.

When the shutter is released, the driving arm 19 rotates counterclockwise in the direction of the arrow A in FIG. 2, whereby the aperture opening blades 4, 15, 16 and 17 are contracted downward in FIG. 1 so as to open the aperture 5a, and put away between the second base plate 2 and the shutter base plate 5, and then an exposure operation is performed.

When a predetermined time has passed after the aperture opening blades start to move, the driving arm 26 is rotated counterclockwise in the direction of the arrow A in FIG. 2 by the known means, whereby the aperture closing blades 3, 22, 23 and 24 move downward in FIG. 1 so as to cover and shade the aperture 5a and finish the exposure operation.

As shown in FIG. 1, in the state in which the exposure operation is completed, the distance between the slit forming blade 3 of the aperture closing blades and the second base plate 2 is longer than the distance obtained by adding the thickness $t_1$ of the first base plate 21 and the distance $t_2$ between the first base plate 21 and the second base plate 2 which is defined by the folding 21g, that is, $t_1 + t_2$. The edge 3a of the blade 3 and a line 21i of the folding 21g of the first base plate 21 are spaced apart from each other by a distance $W_2$, and the blade 3 and the second base plate 2 overlap by a predetermined width $W_1$.

In order to set the predetermined distance $t_2$ between the first base plate 21 and the second base plate 2, instead of the folding 21g, a projection may be mounted on the edge 21b. Furthermore, the predetermined distance $t_2$ may be set by mounting a projection on the side of the second base plate 2.

As described above, according to the embodiment, the space having the predetermined distance $t_2$ is formed at the aperture 2a between the first base plate 21 and the second base plate 2 by mounting the folding 21g on the first base plate 21. Therefore, even if the slit forming blade 3, made of aluminum, titanium, a compound thereof or the like having a rigidity lower than that of iron or the like, is run at high speed, the slit 3a of the blade 3 is prevented from colliding with the edge 21b of the aperture of the first base plate 21 and the edge 2a of the aperture of the second base plate 2.

I claim:

1. A shutter device, comprising:
   aperture opening blades including a blade having an edge for forming an exposure slit and movable in a predetermined direction on a first plane;
   aperture closing blades including a blade having an edge for forming an exposure slit and movable in the direction almost parallel to said predetermined direction on a second plane parallel to said first plane;
   a base member disposed between said aperture opening blades and said aperture closing blades and including a first base plate disposed opposite to said aperture closing blades and a second base plate disposed opposite to said aperture opening blades, said first and second base plates each having an aperture for forming an exposure aperture;
   said first and second base plates each having an edge of said aperture positioned opposite to said edge of said aperture closing blades covering said exposure aperture;
   said edge of said first base plate being positioned such that said edge of said aperture closing blades covering said exposure aperture is disposed outside said aperture of said first base plate and said edge of said second base plate being positioned such that said edge of said aperture closing blades covering said exposure aperture is disposed inside said aperture of said second base plate; and
   means for spacing said first and second base plate by a predetermined amount so as to set said edge of said second base plate away from said second plane.

2. A shutter device as claimed in claim 1, wherein said means is disposed along said edge of said first base plate between said first and second base plates.

3. A shutter device as claimed in claim 2, wherein said means includes a projection which projects from said edge of said first base plate toward said second base plate.

4. A shutter device as claimed in claim 3, wherein said projection is formed by folding at least a part of said edge of said first base plate.

* * * * *